Patented June 26, 1951

2,558,527

UNITED STATES PATENT OFFICE 2,558,527

PROCESS OF PRODUCING RUBBERY POLYMER-ACID REACTION PRODUCTS

Gottfried Ernst Rumscheidt and Johannes Thomas Hackmann, Amsterdam, Netherlands, assignors to Shell Development Company, San Francisco, Calif., a corporation of Delaware No Drawing. Application August 29, 1949, Serial No. 113,022. In the Netherlands October 14, 1948

3 Claims. (Cl. 18—54)

This invention relates to the formation of reaction products between high molecular polyunsaturated compounds and inorganic acid compounds, and it is particularly concerned with the provision of materials useful in promoting or accelerating the formation of such reaction products. In brief, the process of this invention may be described as one wherein the reactivity of said polyunsaturated compounds as regards the acid compounds is increased by treatment with aralkyl hydroperoxides of the type of cumene hydroperoxide and ethyl benzene hydroperoxide.

The term "high molecular weight, polyunsaturated compound," as employed herein, embraces those compounds having a molecular weight of at least 5,000 and which contain a plurality of unsaturated linkages in the molecule. These compounds are either polymers of organic compounds containing a plurality of unsaturated linkages in the molecule, or are copolymers of such multiple-unsaturated compounds with other unsaturated organic compounds of one type or another. The term includes the various natural rubbers such as latex, crepe, sheet, caoutchouc, gutta percha, balata, and cyclo rubbers, as well as unsaturated synthetic rubbers. Representative synthetic polymers of high molecular weight are the polymerization products of butadiene and those of its homologues and derivatives, as, for example, methyl butadiene polymers, dimethyl butadiene polymers, pentadiene polymers, and chloroprene polymers (neoprene synthetic rubber). Representative copolymers of high molecular weight which come within the term are those formed from butadiene, its homologues and derivatives, with other unsaturated organic compounds. Among the latter are the acetylenes, as vinyl acetylene, the olefins, as isobutylene which copolymerizes with butadiene to form butyl synthetic rubber; the vinyls, as vinyl chloride, acrylic acid, acrylonitrile (which polymerizes with butadiene to form the synthetic rubber Buna-N), methacrylic acid, and styrene, the latter compound polymerizing with butadiene to form the synthetic rubber Buna S; as well as the vinyl esters and various unsaturated aldehydes, ketones, and ethers, e. g., acrolein, methyl isopropenyl ketone, and vinyl ethyl ether. The above-defined, polyunsaturated, high molecular weight compounds, including both natural and synthetic rubbers, may properly be termed "high molecular weight polymers of diene-hydrocarbons," or preferably, "rubbery polymers of at least one compound selected from the group consisting of the conjugated diolefins and chloroprene."

As employed herein, the term "inorganic acidifying compound" embraces the various inorganic acids and acid anhydrides wherein the acid-forming element (as sulfur, nitrogen or phosphorus, for example), if possessing several valencies, is present in a valency other than the highest thereof. Preferred acidifying compounds are the acid anhydrides sulfur dioxide, phosphorus trioxide and nitrous trioxide, as well as the acids formed from these anhydrides. Other useful acidifying compounds are hydrogen sulfide, hydrochloric acid, hydrobromic acid, hydroiodic acid, and hydrofluoric acid. The term does not include such compounds as sulfur trioxide, phosphorus pentoxide, nitrogen pentoxide, or their corresponding acids, for in all these compounds the acid-forming element, which is here either sulfur, phosphorus or nitrogen, is present in the highest of several possible valencies. Of the various acidifying compounds set forth herein, the most preferred compound for employment in the present invention is sulfur dioxide.

It is known that the high molecular weight polyunsaturated compounds lend themselves well to the production of various shapes, including those of a continuous, non-supported nature, as filaments, rods, strips, sheets, and the like. Furthermore, it is known that the properties of such shapes may be improved by reacting the unsaturated, high molecular weight compound with one or more of the inorganic acidifying compounds mentioned above, particularly sulfur dioxide. The exact nature of this reaction is not clearly understood, though it is evident that a quantity of the acidifying ingredient is taken up in one form or another by the high molecular weight reactant. The extent of this reaction is normally measured by, and expressed in terms of, the amount of acid-forming element (sulfur, phosphorus or nitrogen, for example) present in the resulting reaction product. It is also possible to improve the nature of the foregoing reaction products by incorporating therein, normally prior to the reaction with sulfur dioxide or other acidifying ingredient, a quantity of low molecular weight, unsaturated compound such as allyl acetate, allyl oleate, diallyl phthalate and diallyl adipate, as described in copending application, Serial No. 15,048, filed March 15, 1948.

It should be noted that while the high molecular weight, poly-unsaturated compounds, or mixtures of both high as well as low molecular weight compounds, may be reacted with the acidifying compound without prior modification of either reactant, it is known that improved results are obtained when the unsaturated compounds are first treated with a suitable activating agent. When making filaments and other continuous objects from high molecular weight compounds by extruding a solution thereof into a coagulating bath containing inorganic acidifying compound, it is of great importance that the reaction between the materials proceed as rapidly as possible, for the objects formed in the bath remain therein for but a few seconds or even less under normal operating conditions; further, while it is important that the reaction proceed rapidly to its conclusion, the extent of the reaction should also be as great as possible, i. e., the unsaturated, high molecular weight compound should react with, and thereby retain, relatively large amounts of inorganic acidifying compound. Such results can only be obtained through use of an activator. Thus, in U. S. Patent No. 2,469,847, issued May 10, 1949, there is disclosed a method whereby the reaction of unsaturated high molecular weight compounds with inorganic acidifying compounds is both speeded up as well as increased in overall extent through use of oxygen yielding substances and particularly hydroperoxides, tetralin hydroperoxide (tetrahydronaphthalene hydroperoxide), peracetic acid or tertiary butyl hydroperoxide being there disclosed as useful for the purpose.

While use of any hydroperoxide activating agent is, in the main, satisfactory, it would be desirable to provide materials of this class which could be used in substantially lesser amounts than is the case with many of the activator compounds now employed. The present practice is to add approximately 15% (based on the weight of rubber present) of a more active peroxide such as tetralin hydroperoxide, for example, while amounts as high as 50% are employed with the less active peroxide compounds such as peracetic acid. The provision of large amounts of activator compound greatly increases the cost of the process and places it at a competitive disadvantage with processes for making other synthetic filaments such as nylon and the various rayons.

It is an object of this invention to provide an improved method for increasing the reactivity of polyunsaturated high molecular weight compounds as regards inorganic acidifying compounds. A more particular object is to provide a class of hydroperoxides having the ability to effect such activation of the high molecular weight reactant even when present in relatively small amount.

Another object is to provide an improved method of producing filaments and other continuous, unsupported shapes made up of the reaction product of a polyunsaturated high molecular weight compound with an inorganic acidifying compound which contain a relatively large proportion of the acid reactant, are relatively stable, have a high tensile strength, and are otherwise well adapted to be woven to fabrics.

Other objects of the invention will be apparent from the nature of the following description.

It is our discovery that the foregoing objects are achieved when the rubber or other polyunsaturated high molecular weight reactant is treated with an aralkyl hydroperoxide prior to its reaction with sulfur dioxide or other organic acidifying compound. The term "aralkyl hydroperoxide," as employed herein, is intended to embrace those compounds wherein the hydroperoxy group (—O—O—H) is attached to a carbon atom of an alkyl group which, in turn, is attached to an aryl nucleus through either the same or a different carbon atom than that to which the hydroperoxy group is attached. The aryl portion of the molecule may be either mono- or polynuclear in character. Representative peroxides, all of which are useful in the practice of the present invention, are 1-phenyl-1-hydroperoxyethane (ethyl benzene hydroperoxide), triphenylmethane hydroperoxide, 2-phenyl-2-hydroperoxypropane (cumene hydroperoxide), 1-phenyl-2-hydroperoxypropane, 1 - phenyl-3-hydroperoxy-4,4-dimethylpentane and 1-phenyl-6-hydroperoxyheptane. The aromatic portion of the molecule may, if desired, be substituted by various alkyl, alkenyl, alkoxy, hydroxyl, carboxyl or nitro groups, for example, as well as by halogen atoms. Further, such groups may carry additional hydroperoxy groups, as is the case with diethyl benzene hydroperoxide, for example.

A preferred group of hydroperoxide compounds is that wherein the aryl portion of the molecule is substituted only by alkyl groups and wherein the alkyl group linking the aryl portion of the compound to the hydroperoxy group contains from 1 to 3 carbon atoms, representative hydroperoxide of this preferred class being triphenylmethane hydroperoxide, ethyl benzene hydroperoxide, xylene hydroperoxide, diethyl benzene hydroperoxide and cumene hydroperoxide.

Several of these hydroperoxides can be prepared by oxidation of the corresponding hydrocarbons. Thus, ethyl benzene hydroperoxide is obtained by treating ethyl benzene with air at room temperature. A suitable process for preparing triphenylmethane hydroperoxide (or triphenylmethyl hydroperoxide) is the treatment of triphenylchloromethane with hydrogen peroxide in alkaline solution (N. Wieland and J. Mayer, Rep. 64 (1931) 1205). Particulars concerning cumene hydroperoxide are found in Journal Ind. and Eng. Chem., 40 (1948) 933.

In many cases it is difficult to separate the hydroperoxide from the solution or reaction mixture in which it is formed. This need offers no difficulty insofar as the present invention is concerned, for it has been found that substantially the same improvement as regards increase in the reactivity of the high molecular weight unsaturated compound may be obtained through use of the hydroperoxides in either their separated or unseparated state.

In carrying out the process of this invention, the hydroperoxide, which term is also meant to include a hydroperoxide-containing mixture or solution, is preferably added directly to the unsaturated high molecular weight compound before the same is reacted with the inorganic acidifying compound, for in this way activation of all portions of the latter compound is assured. During treatment with hydroperoxide, the unsaturated high molecular weight reactant may be in either the dissolved, swollen, or solid state. In the preferred practice of the invention, however, a solution (which term also includes dispersion) of the high molecular weight compound is formed and the hydroperoxide is added thereto. The resulting activation is achieved in a substantially instantaneous manner at room temperatures and under normal atmospheric conditions.

It is possible to vary widely the conditions under which such activated solutions may be reacted with the acidifying compound. If, for example, sulfur dioxide is introduced in either the gaseous, liquid or dissolved state into a solution of the activated polymeric material, a jell-like reaction product is obtained which can either be dried into the desired solid form or be used in the liquid condition, as in finishes of one type or another. On the other hand, when solutions of the activated material are injected into a liquid bath containing dissolved sulfur dioxide, as a solution thereof in a water-alcohol mixture, there are precipitated filamentary reaction products.

It is an advantage of the present invention that relatively little of the hydroperoxide, as compared with the weight of rubber or other high molecular weight reactant present, need be employed. Thus, good activation of rubber, synthetic butadiene rubbery polymers, or other high molecular weight, polyunsaturated reactants is achieved through use of from about 3 to 12% of aralkyl hydroperoxide (based on the weight of rubber or similar reactant present), though a preferred range is from about 5 to 10%. Polyunsaturated high molecular weight compounds activated with such amounts of hydroperoxide have the capacity to react in a substantially instantaneous manner with relatively large volumes of sulfur dioxide or other inorganic acidifying compounds. Further, the resulting reaction products are relatively stable (i. e., resistant to deterioration with age) and have a high tensile strength. For these reasons, filaments produced from such reaction products are well adapted to be woven into fabrics.

The following examples serve to illustrate the invention.

*Example I*

To a 6% solution of plasticized latex crepe rubber in equal parts by volume of benzene and toluene was added 5% cumene hydroperoxide, calculated on the weight of rubber present. The resulting solution was then immediately extruded through a spinneret with perforations of 0.09 mm. diameter into a coagulating bath consisting of ethanol and water in the weight ratio of 4:1, said bath containing dissolved sulfur dioxide in a concentration of 400 grams per liter and being maintained at a temperature of $-5°$ C. In the bath the injected rubber solution instantaneously reacted with the sulfur dioxide to form insoluble filamentary shapes which were removed from the bath, washed and dried. These dried filaments had a high sulfur content (approximately 21%) and were also high in tensile strength (about 180 to 190 g./100 denier); they proved well adapted to be woven into fabrics. The resistance of the filaments against deterioration with age was good.

In a companion operation conducted under the same conditions as those described in the preceding paragraph, but using tetralin hydroperoxide instead of cumene hydroperoxide as the activating agent, it was found necessary to use approximately 15% tetralin hydroperoxide (based on the weight of rubber present) in order to obtain filaments whose quality as regards sulfur content, tensile strength and other physical characteristics was equal to that of the filaments produced using 5% cumene hydroperoxide as the activating agent.

In still another companion operation conducted under the same conditions as described in the first paragraph of this example, the amount of cumene hydroperoxide employed was increased to 15%. In this case, however, the filaments were low in tensile strength (140 g./100 denier) and unfit for use in fabrics.

*Example II*

In this operation filaments were produced according to the method of Example I, but using 12% triphenylmethyl hydroperoxide, calculated on the quantity of rubber present, instead of cumene hydroperoxide. These filaments had a sulfur content of 21% by weight, and their tensile strength and resistance against deterioration with age were both good.

In companion operations filaments of substantially the same quantity as those produced by activation with triphenylmethyl hydroperoxide were formed using ethyl benzene hydroperoxide and then diethyl benzene hydroperoxide as the activating agents for the rubber. In these operations amounts of peroxide as high as 15% were used without harmful results, though the use of but 5 to 10% thereof is of substantially equal benefit.

*Example III*

To a 6% solution of plasticized latex crepe rubber in equal parts by volume of benzene and toluene was added 3% of triphenylmethyl hydroperoxide, calculated on the weight of rubber present. The resulting solution was then extruded into a water-ethanol coagulating bath maintained at $-5°$ C. and containing 200 grams of sulfur dioxide per liter. In this bath the injected rubber solution reacted with the sulfur dioxide to form insoluble filamentary shapes which were removed from the bath, washed and dried. The resulting filaments had a sulfur content of 17.6%. Their resistance against deterioration with age was good, as determined by subjecting them to an accelerated aging test wherein the filaments were heated at 125° C. for 2 hours, during which time the filaments lost but 8.4% of their content of sulfur dioxide.

In a companion operation conducted using 3% tetralin hydroperoxide as the activating agent, filaments were produced having a smaller sulfur content (16.9%) and a resistance against deterioration of little more than half that of the filaments produced using triphenylmethyl hydroperoxide as the activator. In this case, the filaments lost 13.3% of their sulfur dioxide content on being heated for 2 hours at 125° C.

*Example IV*

Polybutadiene obtained by polymerization of butadiene with sodium as a catalyst (molecular weight approximately 50,000) was dissolved in a mixture of equal parts by volume of benzene and toluene to a concentration of 6% by weight. On adding 10% cumene hydroperoxide to the solution a material is obtained which, on being spun into a water-alcohol coagulating bath (80% by volume ethanol) containing 300 grams sulfur dioxide per liter and maintained at 0° C., yields filaments which, on being dried, are found to be high in sulfur and to possess good tensile strength. They are well adapted to be woven into fabrics.

The various percentages expressed herein are on a weight basis unless otherwise indicated.

The invention claimed is:

1. In a process of producing filaments wherein a solution containing hydroperoxide and a rubbery polymer selected from the group consisting of the conjugated diolefins and chloroprene is injected into a coagulating bath containing available sulfur dioxide wherein the rubbery polymer reacts with the sulfur dioxide to form an insoluble filamentary reaction product which is then withdrawn from the bath, the improvement comprising employing, in said rubbery polymer solution, from about 3 to 12%, based on the weight of rubbery polymer present, of an aralkyl hydroperoxide wherein the hydroperoxide group is linked to a carbon atom of an alkyl group containing from 1 to 3 carbon atoms which is linked to an aryl nucleus.

2. The method of claim 1 wherein the rubbery polymer is natural rubber and the hydroperoxide is selected from the group consisting of triphenylmethane hydroperoxide, ethylbenzene hydroperoxide, diethylbenzene hydroperoxide and cumene hydroperoxide.

3. The method of claim 1 wherein the rubbery polymer is a synthetic, rubbery, butadiene polymer and wherein the hydroperoxide is selected from the group consisting of triphenylmethane hydroperoxide, ethylbenzene hydroperoxide, diethylbenzene hydroperoxide and cumene hydroperoxide.

GOTTFRIED ERNST RUMSCHEIDT.
JOHANNES THOMAS HACKMANN.

REFERENCES CITED

The following references are of record in the file of this patent:

UNITED STATES PATENTS

| Number | Name | Date |
| --- | --- | --- |
| 2,288,982 | Waterman | July 7, 1942 |
| 2,469,847 | Rumscheidt et al. | May 10, 1949 |

OTHER REFERENCES

Vandenberg et al., Ind. and Eng. Chem., May 1948, pages 932–937.